United States Patent
Arias

(10) Patent No.: US 9,470,361 B1
(45) Date of Patent: Oct. 18, 2016

(54) WALL MOUNTED BRACKET ASSEMBLY FOR SECURING ARTICLES

(71) Applicant: Victor Arias, South Miami, FL (US)

(72) Inventor: Victor Arias, South Miami, FL (US)

(*) Notice: Subject to any disclaimer, the term of this patent is extended or adjusted under 35 U.S.C. 154(b) by 0 days.

(21) Appl. No.: 14/794,342

(22) Filed: Jul. 8, 2015

(51) Int. Cl.
*F16B 45/00* (2006.01)
*F16B 47/00* (2006.01)
*A62B 25/00* (2006.01)
*F16M 13/02* (2006.01)
*F16B 11/00* (2006.01)
*F16B 2/08* (2006.01)
*F17C 13/08* (2006.01)
*A62C 13/78* (2006.01)

(52) U.S. Cl.
CPC ............ *F16M 13/022* (2013.01); *F16B 2/08* (2013.01); *F16B 11/006* (2013.01); *F16B 47/00* (2013.01); *F17C 13/08* (2013.01); *A62B 25/00* (2013.01); *A62C 13/78* (2013.01); *F16B 45/00* (2013.01)

(58) Field of Classification Search
CPC .... F17C 13/08; F17C 2270/07; F16B 45/00; F16B 47/00; A62C 13/78; A62B 25/00; B60N 3/102; B60N 3/103
USPC ............... 248/309.1, 310, 313, 346.06, 304, 248/311.2, 205.2, 206.9, 690; 211/85.18; 220/148.7, 737
See application file for complete search history.

(56) References Cited

U.S. PATENT DOCUMENTS

| | | | |
|---|---|---|---|
| 2,936,992 A | 5/1960 | Browning | |
| 3,218,014 A | 11/1965 | Frazier | |
| 3,565,384 A * | 2/1971 | Lockwood | A62C 13/78 211/85.18 |
| 4,304,379 A | 12/1981 | Christensen | |
| 4,379,541 A * | 4/1983 | Harkness | A47K 1/08 248/313 |
| 4,997,157 A * | 3/1991 | Sweeny | A62C 13/78 248/310 |
| 5,071,100 A | 12/1991 | Sweeny | |
| 5,301,634 A | 4/1994 | Ho | |
| 5,632,427 A * | 5/1997 | Gattuso | A01K 97/10 211/70.8 |
| 6,340,143 B1 | 1/2002 | McCraney | |
| 6,619,082 B1 | 9/2003 | Bentley | |
| 6,926,243 B1 * | 8/2005 | Ziaylek | A62B 25/00 248/307 |
| 7,103,942 B2 | 9/2006 | Youngberg | |
| 7,275,729 B2 * | 10/2007 | Sherman | A47G 25/08 224/148.7 |
| 7,287,735 B2 | 10/2007 | Heerdt et al. | |
| 2003/0066939 A1 | 4/2003 | Foreman | |
| 2010/0006713 A1 | 1/2010 | Fitzpatrick | |
| 2014/0271098 A1 | 9/2014 | Muderlak et al. | |

FOREIGN PATENT DOCUMENTS

CA 1321184 C 8/1993

* cited by examiner

*Primary Examiner* — Tan Le
(74) *Attorney, Agent, or Firm* — Albert Bordas, P.A.

(57) ABSTRACT

A wall mounted bracket assembly for securing articles, having a bracket assembly with a cooperative shape and dimension to be mounted onto a wall or surface. The bracket assembly has front, rear, top, and bottom walls, and first and second sidewalls. The bracket assembly further has a central opening, holes, and mounting means for mounting the bracket assembly. A strap assembly has a strap and a buckle. Positioned at the first and second sidewalls are first and second notches respectively with respective mounting holes to receive a respective strap holder post. A container is held by the strap, whereby the strap is adjusted at the buckle according to dimensions of the container with a predetermined tension. The container is a trashcan, laundry basket, bag, or receptacle.

19 Claims, 2 Drawing Sheets

US 9,470,361 B1

WALL MOUNTED BRACKET ASSEMBLY FOR SECURING ARTICLES

BACKGROUND OF THE INVENTION

1. Field of the Invention

The present invention relates to bracket systems, and more particularly, to wall mounted bracket assemblies for securing articles.

2. Description of the Related Art

Applicant believes that one of the closest references corresponds to U.S. Patent Application Publication No. 20140271098 A1, published on Sep. 18, 2014 to Muderlak; Todd J. et al for Vertical Structure Bracket Mount Apparatus and System. However, it differs from the present invention because Muderlak, et al teaches a bracket mount for a disposal bin that includes a vertical support plate for engaging a vertical structure, such as a wall or washroom partition; a bin plate for engaging the disposal bin, wherein the bin plate and the vertical support plate are pivotally engaged; and a cover stilt for supporting the cover the disposal bin in an opened position. The bracket mount may be provided as part of a container assembly including a bin and a cover, wherein when the bin plate with the bin attached thereto is positioned proximal to the vertical support plate, the cover is pivotal to cover and uncover the open end of the bin, and when the bin plate with the bin attached thereto is pivoted outwardly from the vertical support plate, the cover stilt is pivotable outwardly from the vertical support plate to support the cover in an open position relative to the bin.

Applicant believes that another reference corresponds to U.S. Patent Application Publication No. 20100006713 A1, published on Jan. 14, 2010 to Fitzpatrick; Mark Bernard for Bag Holder. However, it differs from the present invention because Fitzpatrick teaches a bag holder that includes a retaining bar that is shaped like a rectangular box. The bag holder also includes a wall bracket having a channel portion complementary to the shape of said retaining bar. The wall bracket can be mounted to a vertical surface such as a wall. A portion of the rim of a plastic bag can be rolled around the retaining bar. Then, the retaining bar with the bag can be inserted into a channel portion thereby securing the bag and facilitating the depositing and withdrawal of articles from the bag opening.

Applicant believes that another reference corresponds to U.S. Patent Application Publication No. 20030066939 A1, published on Apr. 10, 2003 to Foreman, Marc Franklin for Restraining System and Method. However, it differs from the present invention because Foreman teaches a restraint system that includes at least two bands with integral lock structures that mechanically interlock with one another during installation.

Applicant believes that another reference corresponds to U.S. Pat. No. 7,287,735 B2 issued to Heerdt, et al. on Oct. 30, 2007 for Fire Extinguisher Bracket Including a Living Hinge. However, it differs from the present invention because Heerdt, et al. teaches a mounting bracket having a living hinge operable to enable mounting straps of the mounting bracket to move between retracted and extended positions. In the extended position, the mounting straps are configured to extend around and retain a fire extinguisher. In the retracted position, the mounting straps are removed from the fire extinguisher. The living hinge may include a continuous piece of material that extends between the mounting straps and a base member of the mounting bracket to which the mounting straps are coupled.

Applicant believes that another reference corresponds to U.S. Pat. No. 7,103,942 B2 issued to Youngberg; Eric Ezra on Sep. 12, 2006 for Buckle for Strapping Used in a Water Heater Security System. However, it differs from the present invention because Youngberg teaches a water heater security system that includes a woven, flexible strap disposed around a water heater to maintain the water heater in a fixed relationship with an adjacent wall. The system includes a pair of wall brackets and may include a buckle assembly. The strap may be formed with two or four ends at least one of which is adjustably attachable to one of the wall brackets or buckle. The buckle can be stamped from metal and bent back on itself to form a slide channel with two sidebars and a crossbar. A slide is disposed within the channel. Side flanges can be formed on the buckle portions or the slide.

Applicant believes that another reference corresponds to U.S. Pat. No. 6,619,082 B1 issued to Bentley; James K. on Sep. 16, 2003 for Wall Mount Corner Gun Lock Assembly. However, it differs from the present invention because Bentley teaches a wall mount corner gun lock assembly having a wall mount bracket, a wall mount bracket cover, a barrel rest, and an open loop gun ring. The wall mount bracket is installed in the corner of a room by a plurality of lag bolts that pass through apertures in the wall mount bracket. The wall bracket cover nests within the wall mount bracket and prevents access to the heads of the lag bolts. One end of the open loop gun ring is inserted through aligned apertures on the respective ends of the wall mount bracket and the wall mount bracket cover and then slid through the aligned apertures of the trigger guards of the firearms to be locked up. An elongated sliding tubular member is slid onto the tip of the open loop gun ring and the sliding tubular member has a length sufficient to close the space between the spaced tips of the open loop gun ring. A keeper member releasably connects the tips of the open gun loop ring together. The keeper member and the sliding tubular member have structure that allow the U-shaped bar of a padlock to be passed downwardly through them and locked thereby preventing removal of any of the firearms from the wall mount gun lock assembly.

Applicant believes that another reference corresponds to U.S. Pat. No. 6,340,143 B1 issued to McCraney; William J. on Jan. 22, 2002 for Fastening Apparatus. However, it differs from the present invention because McCraney teaches an apparatus and method for restraining a water heater to a supporting structure, such as a wall. The fastening system includes at least one bracket which mounts to the supporting structure and at least one restraining strap, one end of which attaches to a bracket, the other end of which can attach to another bracket, or mount directly to the wall, to hold the water heater tightly against the supporting structure. In some embodiments, the strap is long enough to encircle the water heater. In other embodiments, the strap can be split into two straps and joined at the water heater with tension buckles. In the preferred embodiment, two straps are used, and both are secured to the supporting structure with brackets. One of the straps encircles the water heater, and both connect to each other at the water heater through tension buckles. In the preferred embodiment, the connection of a strap to its tension buckle is made by a single slot, which contains a pointed tab, which pierces a hole in the strap to securely fasten the strap to the tension buckle.

Applicant believes that another reference corresponds to U.S. Pat. No. 5,301,634 A issued to Ho; Ying-Kuan on Apr. 12, 1994 for Animal Feeder Having A Mounting Device. However, it differs from the present invention because Ho teaches a mounting device that secures an animal feeder to a horizontal wire member of an animal house and includes a board, a pair of flaps extended from the board for engagement with the horizontal wire member, a pair of ears extended rearward from the board, and an elastic belt having two ends engaged with the ears so as to clamping the animal feeder to the board. The animal feeder is solidly secured to the board, and the board is secured to the animal house.

Applicant believes that another reference corresponds to U.S. Pat. No. 5,071,100 A issued to Sweeny; Henry D. on Dec. 10, 1991 for Multi-Purpose Canister Wall Bracket. However, it differs from the present invention because Sweeny teaches a bracket assembly for supporting a cylindrical canister, such as a fire extinguisher, that includes a base unit having a longitudinally extending, transversely concave, front surface for cradling the canister therein and a separate flexible strap member which can be wrapped around the canister to hold it against the base unit. The base unit includes opposing cutouts in the sides thereof into which a central section of the strap can be pressed before mounting on the wall so as to interlock the strap member with the base unit. One end of the strap has a hook member thereon for engaging the other end of the strap by way of a selected one of a plurality of mating apertures therethrough. The back surface of the base unit is transversely concave and the strap member has rearwardly projecting wedge members which engage the wall during mounting and preset the strap to conform generally to the shape of the back surface. The bracket assembly provides support for a canister.

Applicant believes that another reference corresponds to U.S. Pat. No. 4,304,379 A issued to Christensen; James H. on Dec. 8, 1981 for Bag Holder. However, it differs from the present invention because Christensen teaches a bag holder removeably mountable on a wall by means of a supporting ring anchored to the holder for providing circumferential support for the open end of a bag, the holder, and having a clamping element pivotally mounted on the ring to permit clamping and anchoring the mouth of the bag to the supporting ring. A cover is also provided for the holder.

Applicant believes that another reference corresponds to U.S. Pat. No. 3,218,014 A issued to Frazier, Michael on Nov. 16, 1965 for Trash Bag Holder and Trash Bag Therefor. However, it differs from the present invention because Frazier teaches a holder for holding and clamping the open top of a bag in receiving position, comprising an open rectangular frame consisting of bars rectangular in cross-section, the top and bottom sides of the bars being horizontal, a bracket supporting the frame in fixed horizontal position, and a rectangular bag open top clamping frame pivoting thereto in overlying relationship to the flat top side of the fixed open rectangular frame, the clamping frame having flat horizontal clamping surfaces and a vertical depending clamping lip on the outer edge of a plurality of the sides of the horizontal clamping surfaces, and an inwardly downwardly slanted non-clamping lip, the lip extending downwardly and inwardly of the clamped portion of the bag, the lip being on the inner edge of each.

Applicant believes that another reference corresponds to U.S. Pat. No. 2,936,992 A issued to Harrison Browning on May 17, 1960 for Holder For Cylindrical Containers. However, it differs from the present invention because Harrison Browning teaches a fuse-case holder of the type described comprising an M-shaped trough, having a slot and a projection intermediate its ends, and a strap having first and second hooks intermediate its ends, said first hook being substantially R-shaped and adapted to fixedly engage said slot, said second hook having a lip portion adapted to engage said projection, said R-shaped hook having sufficient resiliency to maintain said strap taut when said lip is in engagement with said projection.

Applicant believes that another reference corresponds to Canadian Patent No. 1321184 C issued to Sweeny, Henry D. on Aug. 10, 1993 for Multi-Purpose Canister Wall Bracket. However, it differs from the present invention because Sweeny teaches a bracket assembly for supporting a cylindrical canister, such as a fire extinguisher, including a base unit having a longitudinally extending, transversely concave, front surface for cradling the canister therein and a separate flexible strap member which can be wrapped around the canister to hold it against the base unit. The base unit includes opposing cutouts in the sides thereof into which a central section of the strap can be pressed before mounting on the wall so as to interlock the strap member with the base unit. One end of the strap has a hook member thereon for engaging the other end of the strap by way of a selected one of a plurality of mating apertures therethrough. The back surface of the base unit is transversely concave and the strap member has rearwardly projecting wedge members which engage the wall during mounting and preset the strap to conform generally to the shape of the back surface. The bracket assembly provides support for a canister.

Other patents describing the closest subject matter provide for a number of more or less complicated features that fail to solve the problem in an efficient and economical way. None of these patents suggest the novel features of the present invention.

SUMMARY OF THE INVENTION

The instant invention is a wall mounted bracket assembly for securing articles, comprising a bracket assembly having a first cooperative shape and dimension to be mounted onto a wall or surface. The wall or surface can be a vertical surface. The bracket assembly comprises a front wall, a rear wall, a top wall, a bottom wall, and first and second sidewalls. The bracket assembly further comprises a central opening, holes, and mounting means for mounting the bracket assembly onto the wall or surface. A strap assembly comprises a strap and a buckle.

Positioned at the first and second sidewalls are first and second notches respectively. Each of the first and second notches comprises a notch sidewall, a notch top wall, and a notch bottom wall. Each notch top wall and notch bottom wall has respective mounting holes to receive a respective strap holder post. The mounting holes are aligned with respect to each other. Proximal ends of the strap are secured to each strap holder post, and distal ends of the strap are adjustably mounted to the buckle. A container is held by the strap, whereby the strap is adjusted at the buckle according to dimensions of the container with a predetermined tension. The container is a trashcan, laundry basket, bag, or receptacle.

The bracket assembly further comprises first and second hook receiver openings that house first and second hooks respectively therein. The first and second hooks rotate approximately 90 degrees upon their respective vertical axis. The first and second hooks remain within their respective hook receiver opening when not deployed. Distal ends of the first and second hooks protrude beyond the front wall when deployed from the first and second hook receiver openings.

The mounting means comprises a suction cup. The central opening extends from the front wall to the rear wall and receives the suction cup. The suction cup has a base, which has a second cooperative shape and dimension to snugly fit within the central through opening. The mounting means comprises screws. The holes are positioned at corners of the bracket assembly and receive the screws therethrough. The mounting means comprises double-sided adhesive tape fixed onto the rear wall. The double-sided adhesive tape has a protective cover. The front wall comprises a bubble level at a predetermined distance from the top wall.

It is therefore one of the main objects of the present invention to provide a wall mounted bracket assembly for securing articles.

It is another object of this invention to provide a wall mounted bracket assembly for securing suspended articles including trash cans, laundry baskets, or any other article or container.

It is another object of this invention to provide a wall mounted bracket assembly for securing articles that is versatile to adapt to different article and container configurations.

It is another object of this invention to provide a wall mounted bracket assembly for securing articles comprising a bubble level for a leveled installation.

It is another object of this invention to provide a wall mounted bracket assembly for securing articles that is volumetrically efficient for carrying, transporting, and storage.

It is another object of this invention to provide a wall mounted bracket assembly for securing articles, which is of a durable and reliable construction.

It is yet another object of this invention to provide such an assembly that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
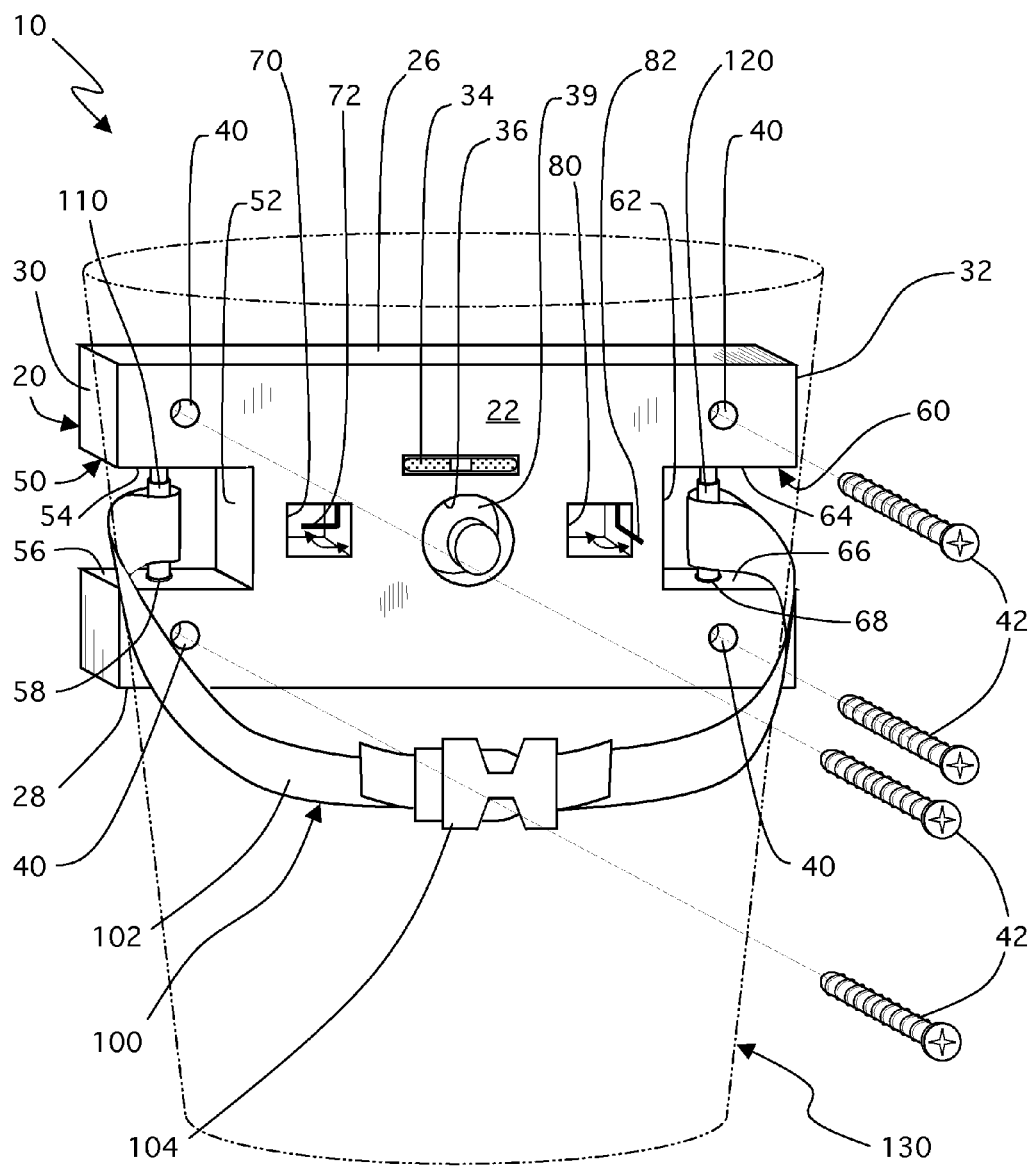
FIG. 1 represents a front isometric view of a wall mounted bracket assembly for securing articles, object of the present invention.

Referring now to the drawings, the present invention is a wall mounted bracket assembly for securing articles and is generally referred to with numeral 10. It can be observed that it basically includes bracket assembly 20 and strap assembly 100.

Figure 2:
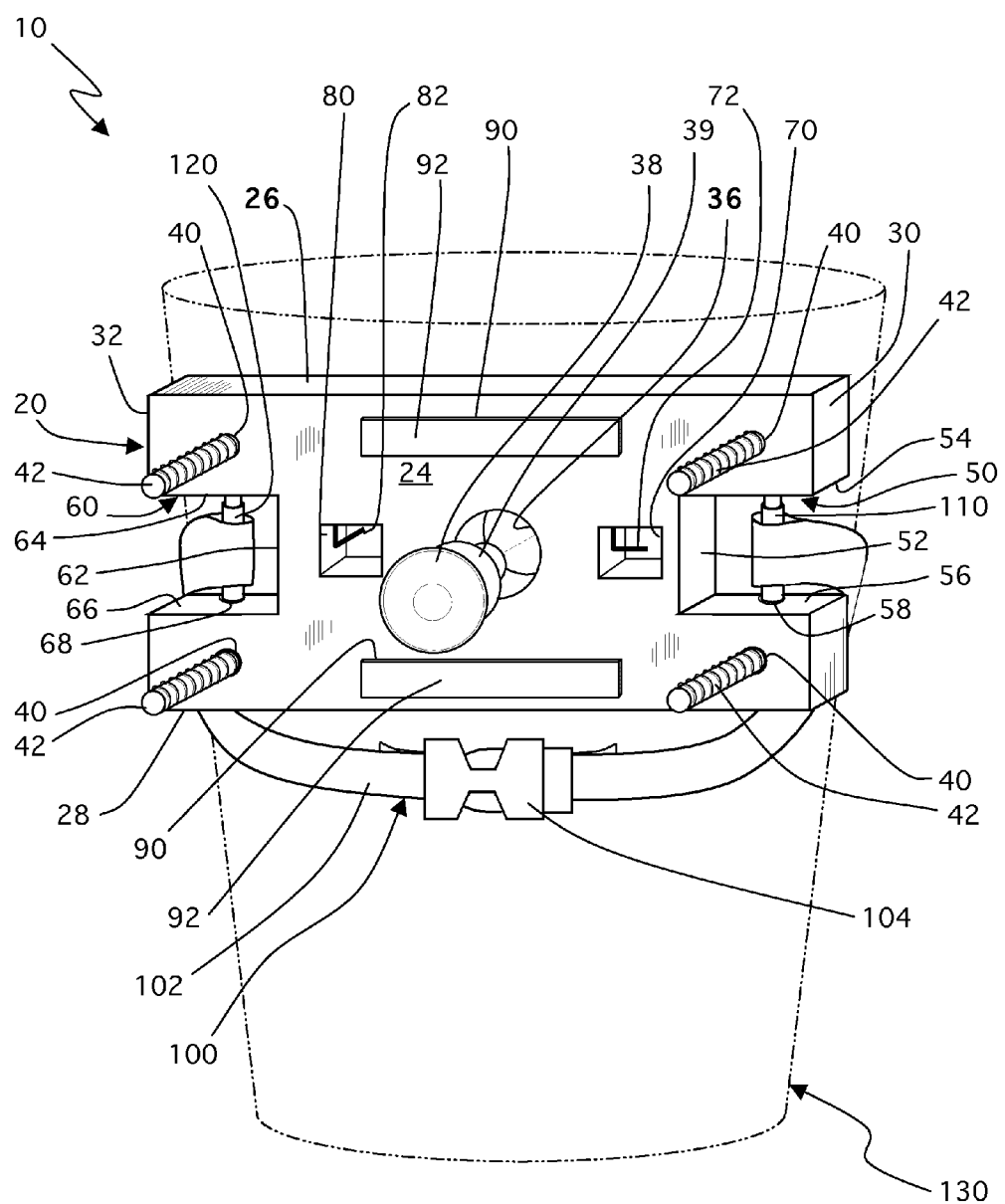
FIG. 2 is a rear isometric view of the present invention.

As seen in FIGS. 1 and 2, bracket assembly 20 has a cooperative shape and dimension to be mounted onto a wall or any other surface, and comprises front wall 22, rear wall 24, top wall 26, bottom wall 28, and sidewalls 30 and 32. Bracket assembly 20 further comprises central opening 36 and holes 40. Additionally, bracket assembly 20 comprises mounting means for mounting onto a surface, such as a vertical surface. The mounting means comprises suction cup 38, screws 42, and/or double-sided adhesive tape 90.

At a predetermined distance from top wall 26, front wall 22 comprises bubble level 34. Bubble level 34 serves as an indicator when mounting bracket assembly 20 onto the surface with the mounting means comprising suction cup 38, screws 42, and/or double-sided adhesive tape 90. Central opening 36 extends from front wall 22 to rear wall 24, and receives suction cup 38 therein. Suction cup 38 has base 39, which has a cooperative shape and dimension to snugly fit within central through opening 36. Holes 40 also extend from front wall 22 to rear wall 24. In a preferred embodiment, bracket assembly 20 comprises four holes 40 positioned at corners of bracket assembly 20. Holes 40 receive screws 42 therethrough to mount bracket assembly 20 onto the surface.

Positioned at sidewall 30 is notch 50. Notch 50 comprises notch sidewall 52, notch top wall 54, and notch bottom wall 56. Notch top wall 54 and notch bottom wall 56 have respective mounting holes 58. In a preferred embodiment, mounting holes 58 are aligned with respect to each other.

Positioned at sidewall 32 is notch 60. Notch 60 comprises notch sidewall 62, notch top wall 64, and notch bottom wall 66. Notch top wall 64 and notch bottom wall 66 have respective mounting holes 68. In a preferred embodiment, mounting holes 68 are also aligned with respect to each other.

Bracket assembly 20 further comprises hook receiver openings 70 and 80 that house respective hooks 72 and 82 therein. Hooks 72 and 82 are rotatably mounted and rotate approximately 90 degrees upon their respective vertical axis. When not being utilized, as in the example of hook 72, it remains within hook receiver opening 70, and when utilized, as in the example of hook 82, its distal end protrudes beyond front wall 22. Hooks 72 and 82 may be used to suspend any bag or suitable article instead of using strap assembly 100.

As best seen in FIG. 2, double-sided adhesive tape 90 is fixed onto rear wall 24. An exterior face of double-sided adhesive tape 90 has protective cover 92 when not in use. Double-sided adhesive tape 90 may be singly used as the mounting means for mounting bracket assembly 20 to the surface, or as reinforcing the mounting thereon.

Strap assembly 100 comprises adjustable strap 102 and buckle 104. Strap holder post 110 is removably mounted to mounting holes 58, and strap holder post 120 is removably mounted to mounting holes 68. Proximal ends of strap 102 are secured to strap holder posts 110 and 120, and distal ends of strap 102 are adjustably mounted to buckle 104. In use, container 130 may be held by strap 102, whereby strap 102 is adjusted at buckle 104 according to dimensions of container 130 with a predetermined tension.

An article, such as a trashcan, laundry basket, or any other article or container may be held and/or secured to present invention 10. For the purposes of illustration, container 130 is represented as a receptacle.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wall mounted bracket assembly for securing articles, comprising:

A) a bracket assembly having a first cooperative shape and dimension to be mounted onto a wall or surface, said bracket assembly comprising a front wall, a rear wall, a top wall, a bottom wall, and first and second sidewalls, said bracket assembly further comprising a central opening, holes, and mounting means for mounting said bracket assembly onto said wall or surface, said bracket assembly further comprises first and second hook receiver openings that house first and second hooks respectively therein; and B) a strap assembly comprising a strap and a buckle.

2. The wall mounted bracket assembly for securing articles set forth in claim 1, further characterized in that positioned at said first and second sidewalls are first and second notches respectively, each of said first and second notches comprises a notch sidewall, a notch top wall, and a notch bottom wall, each said notch top wall and said notch bottom wall have respective mounting holes to receive a respective strap holder post.

3. The wall mounted bracket assembly for securing articles set forth in claim 2, further characterized in that respective said mounting holes are aligned with respect to each other.

4. The wall mounted bracket assembly for securing articles set forth in claim 2, further characterized in that proximal ends of said strap are secured to each said strap holder post, and distal ends of said strap are adjustably mounted to said buckle.

5. The wall mounted bracket assembly for securing articles set forth in claim 4, further characterized in that a container is held by said strap, whereby said strap is adjusted at said buckle according to dimensions of said container with a predetermined tension.

6. The wall mounted bracket assembly for securing articles set forth in claim 5, further characterized in that said container is a trashcan, laundry basket, bag, or receptacle.

7. The wall mounted bracket assembly for securing articles set forth in claim 1, further characterized in that said first and second hooks are rotatably mounted.

8. The wall mounted bracket assembly for securing articles set forth in claim 1, further characterized in that said first and second hooks rotate upon their respective vertical axis.

9. The wall mounted bracket assembly for securing articles set forth in claim 1, further characterized in that said first and second hooks rotate approximately 90 degrees upon their respective vertical axis.

10. The wall mounted bracket assembly for securing articles set forth in claim 1, further characterized in that said first and second hooks remain within their respective said hook receiver opening when not deployed.

11. The wall mounted bracket assembly for securing articles set forth in claim 1, further characterized in that distal ends of said first and second hooks protrude beyond said front wall when deployed from said first and second hook receiver openings.

12. The wall mounted bracket assembly for securing articles set forth in claim 1, further characterized in that said wall or surface is a vertical surface.

13. The wall mounted bracket assembly for securing articles set forth in claim 1, further characterized in that said mounting means comprises a suction cup.

14. The wall mounted bracket assembly for securing articles set forth in claim 13, further characterized in that said central opening extends from said front wall to said rear wall and receives said suction cup.

15. The wall mounted bracket assembly for securing articles set forth in claim 13, further characterized in that said suction cup has a base, which has a second cooperative shape and dimension to snugly fit within said central through opening.

16. The wall mounted bracket assembly for securing articles set forth in claim 1, further characterized in that said mounting means comprises screws, said holes are positioned at corners of said bracket assembly and receive said screws therethrough.

17. The wall mounted bracket assembly for securing articles set forth in claim 1, further characterized in that said mounting means comprises double-sided adhesive tape fixed onto said rear wall.

18. The wall mounted bracket assembly for securing articles set forth in claim 17, further characterized in that an exterior face of said double-sided adhesive tape has a protective cover.

19. The wall mounted bracket assembly for securing articles set forth in claim 1, further characterized in that at a predetermined distance from said top wall, said front wall comprises a bubble level.

* * * * *